US009212903B2

(12) United States Patent
Cook et al.

(10) Patent No.: US 9,212,903 B2
(45) Date of Patent: Dec. 15, 2015

(54) ARTICULATED SCANNER

(71) Applicant: Footmaxx of Virginia, Inc., Roanoke, VA (US)

(72) Inventors: Harold A. Cook, Pittsburgh, PA (US); Michael K. Formica, Butler, PA (US); Timothy Nye, Roanoke, VA (US)

(73) Assignee: Footmaxx of Virginia, Inc., Roanoke, VA (US)

( * ) Notice: Subject to any disclaimer, the term of this patent is extended or adjusted under 35 U.S.C. 154(b) by 59 days.

(21) Appl. No.: 14/219,084

(22) Filed: Mar. 19, 2014

(65) Prior Publication Data

US 2015/0268037 A1 Sep. 24, 2015

(51) Int. Cl.

| | |
|---|---|
| ***G01B 11/24*** | (2006.01) |
| ***G01B 11/25*** | (2006.01) |
| ***A43D 1/02*** | (2006.01) |

(52) U.S. Cl.
CPC ............ *G01B 11/2518* (2013.01); *A43D 1/025* (2013.01)

(58) Field of Classification Search
USPC ........ 356/601–602, 2, 12, 607–608; 267/120, 267/124; 33/512, 515; 12/1 R, 1 F, 1 G, 1 W, 12/142 N, 146 M, 140; 49/386; 296/56
See application file for complete search history.

(56) References Cited

U.S. PATENT DOCUMENTS

| | | | |
|---|---|---|---|
| 3,851,867 | A | 12/1974 | Fricko |
| 3,947,006 | A | 3/1976 | Bauer et al. |
| 4,156,523 | A | 5/1979 | Bauer |
| 4,287,833 | A | 9/1981 | Roldness et al. |
| 5,237,520 | A | 8/1993 | White |
| 6,141,889 | A | 11/2000 | Baum |

*Primary Examiner* — Tri T Ton
(74) *Attorney, Agent, or Firm* — Sturm & Fix LLP

(57) ABSTRACT

An articulated scanner for scanning a patient's foot in a neutral position, i.e. without the weight of the patient or the patient's foot on the scanner, has multiple arms and multiple adjusting members for first allowing the scanner to be easily positioned to desired positions and then temporarily held in any chosen position while a patient's foot is being scanned.

4 Claims, 4 Drawing Sheets

Fig. 3A

ARTICULATED SCANNER

TECHNICAL FIELD

This invention relates generally to a static scanner and more particularly to a static scanner that has an articulating base for easy adjustment to multiple positions.

BACKGROUND

In the making of orthopedic appliances such as custom orthotics, custom shoes and custom sandals, all referred to herein as "corrective orthotics," to aid in the correction or prevention of malformations of the feet, it is necessary to first obtain an image of the foot. Measurements are then taken of the image for the purpose of duplicating the contours of the foot. For accuracy, the foot image must be taken while the foot is positioned in a normal condition. Prior art conventional practice, which remained unchanged for years, was to make a depression with the foot. Plaster of Paris is then poured into the negative depression, producing a duplicate mold or cast of the bottom of the foot. From the molded form, which provides an exact duplication of the contours of the foot, an orthopedic device such as an arch support or an entire shoe is made. One material used for making the negative image is foam that is in a box. The patient steps into the foam to make an impression of the foot.

Those methods of producing an image of a foot required a significant amount of material and equipment in terms of volume and mass. Additionally, the casts produced were voluminous, requiring significant storage space. Transfer of the casts to another location requires significant effort and expense as well.

These previous methods of producing an image of a foot have been replaced in recent years by flat bed scanners generally of the type shown in U.S. Pat. No. 5,237,520 to White and U.S. Pat. No. 6,141,889 to Baum, for acquiring measurements and data necessary for producing orthotics and corrective shoes and sandals using electronic data that can easily be stored and transferred over common communication pathways.

Many prior art scanners require the patient to stand, at least with one foot, on the scanner and the scanner picks up the pressure points of the foot in multiple colors. Recently static scanners have been used instead. These static scanners, are not used with the patient standing on the scanner, but instead require the patient to move to a position wherein the patient's foot can be placed on the scanner without significant pressure of the foot against the scanner. In these static scanners it is often difficult to for the patient to move to the required stationary position for obtaining a scan of their feet.

Unlike the prior art scanners, as mentioned above, that estimate 3D geometry by analyzing the color of a foot and, by extension pressure, the scanner of the instant invention directly collects 3D geometry. Both types of systems can be used to build an orthotic, but their operating principles are very different. There are prior art systems that use any of multiple measurement methods. Accordingly, it may be helpful to define terms used in the various methodologies that can be used as follows:

"Pressure" is defined as a system that measures the pressure of the foot and extrapolates shape and load from that data. By design, requires a weight-bearing 'scan'.

"2D" is defined as a system that takes an image (black-and-white or color) of the foot, either while weight bearing, or non-weight bearing. That data is used to determine the outline of the foot. Also, colorization of the skin as it compresses against the window is used to approximate pressure and or height of the foot.

"3D" is defined as a system that takes 3-dimensional measurements of the foot, either weight bearing or non-weight bearing. These systems may or may not include an additional 2D measurement in black-and-white or color). These systems typically use a laser or multiple cameras (stereo) to determine height measurements to create a 3D model.

Accordingly there is a need for a static scanner mounting device which permits the scanner to be adjusted to and then temporarily held in a desired position to adapt to a comfortable position for the patient to obtain a scan of the patient's foot.

SUMMARY OF THE INVENTION

The present invention provides a novel method and apparatus for adjusting a scanner to a desired position and holding the scanner in such a perfect neutral position without weight for obtaining foot measurements for the purpose of being able to make corrective footwear such as arch supports, orthotics, and corrective shoes and sandals. It is a further purpose of the present invention to use such scanned information to produce data needed for the necessary measurements in electronic format for ease of storage and transmittal.

BRIEF DESCRIPTION OF THE DRAWINGS

The above needs are at least partially met through provision of the apparatus described in the following detailed description, particularly when studied in conjunction with the following drawings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
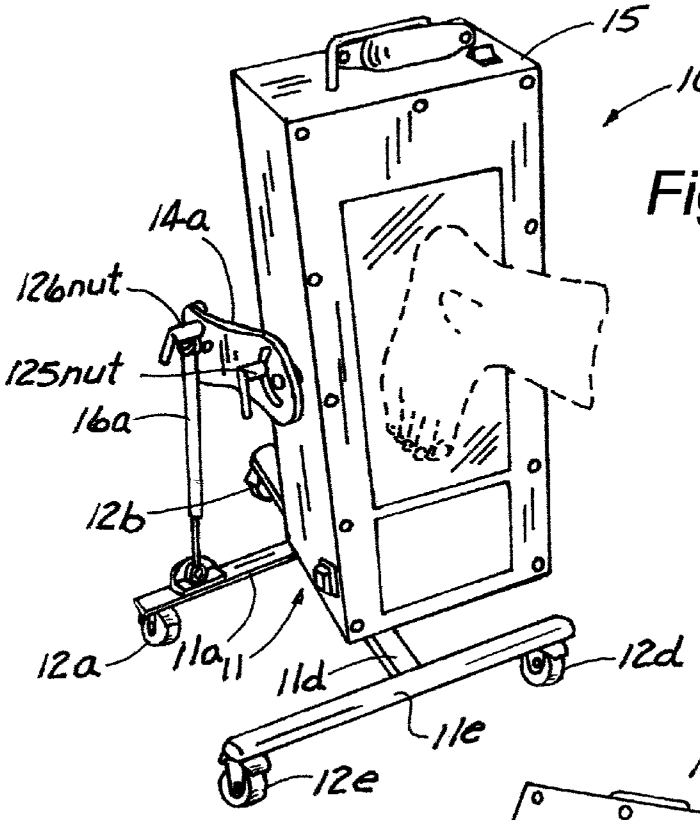
FIG. 1 is a perspective view of an articulated scanner of the present invention in a position to permit a patient, while standing on one foot, put their other foot on a scanner while the scanner is behind the patient.
Figure 2:
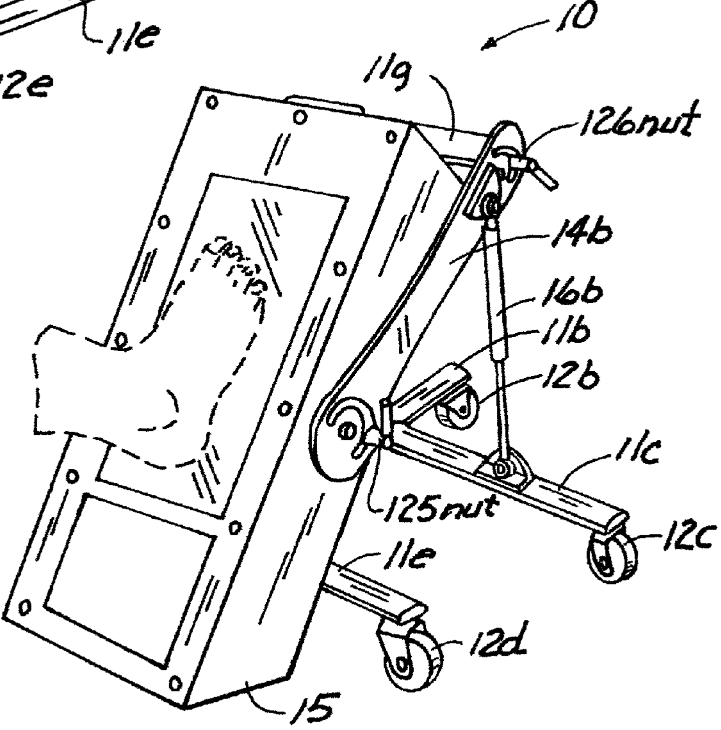
FIG. 2 is a perspective view of the articulated scanner of FIG. 1 showing the scanner moved to a second position to permit a patient, while standing on one foot, put their other foot on a scanner in a non-weight bearing position while the scanner is in front of the patient.

Referring now to the drawings, wherein like reference numerals indicate identical, mirror image or similar parts throughout the several views, the apparatus 10 shown in FIG. 1 includes a scanner 15 positioned so as to allow a person standing with the person's back to the scanner 15 to place the person's foot on the scanner 15 in a neutral, non-weight, minimal pressure arrangement for scanning. FIG. 2 shows the scanner 15 moved to an alternate position to permit the scanner 15 to scan the person's foot while the patient is standing in front of the scanner 15.

The scanner 15 is mounted on a frame 11 comprising frame parts 11*a*, 11*b*, 11*c*, 11*d*, 11*e*, 11*f* and 11*g*.

A first arm (14*a*) is operatively pivotally attached to the base frame (11) along a first substantially horizontal axis (114*a*) and the scanner (15) is operatively attached to the first arm (14) along a second substantially horizontal axis (114*b*). The second substantially horizontal axis (114*b*) is substantially parallel to the first substantially horizontal axis (114*a*).

A first pneumatic cylinder (16*a*) (See FIGS. 1-3A) has a first part (16*ar*) operatively pivotally attached to the base frame (11) and a second part (16*ac*) operatively pivotally attached to the first arm (14), the first and second parts (16*ar*/16*ac*) being telescopically disposed with respect to each other. One of the first and second parts (16*ar*/16*ac*) has a piston portion (16*ap*) thereon slideably disposed in the other one of the first and second parts (16*ar*/16*ac*). The first pneumatic cylinder (16*a*) has a first length and a second length, the first length being greater than the second length, the first pneumatic cylinder further being biased to the first length for reasons that will be explained below.

Figure 3:
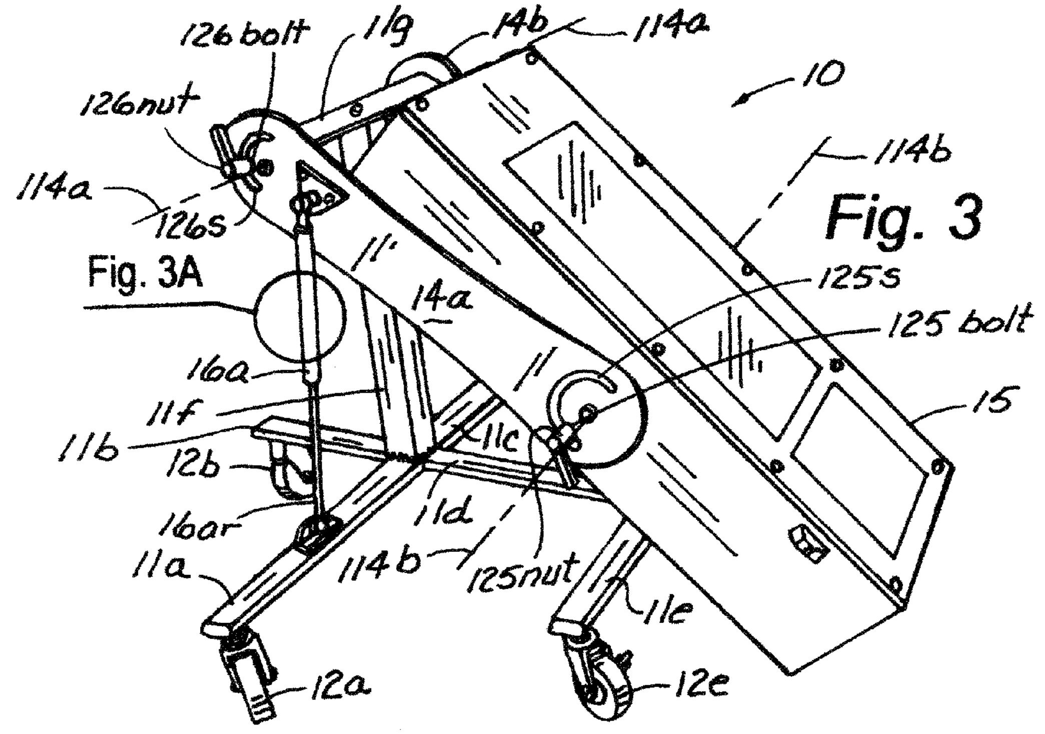
FIG. 3 is a perspective view of the scanner showing the adjusting portions thereof with the scanner being positioned to a position similar to the FIG. 2 position thereof.
Figure 3A:
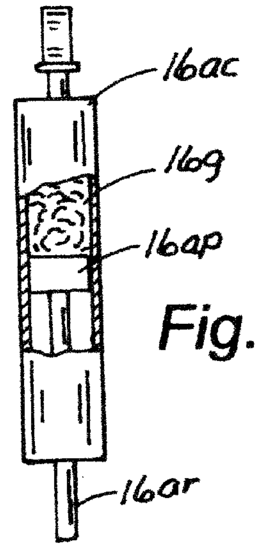
FIG. 3A shows a pneumatic cylinder of FIG. 3, with a portion broken away to show a piston inside of the cylinder.
Figure 5:
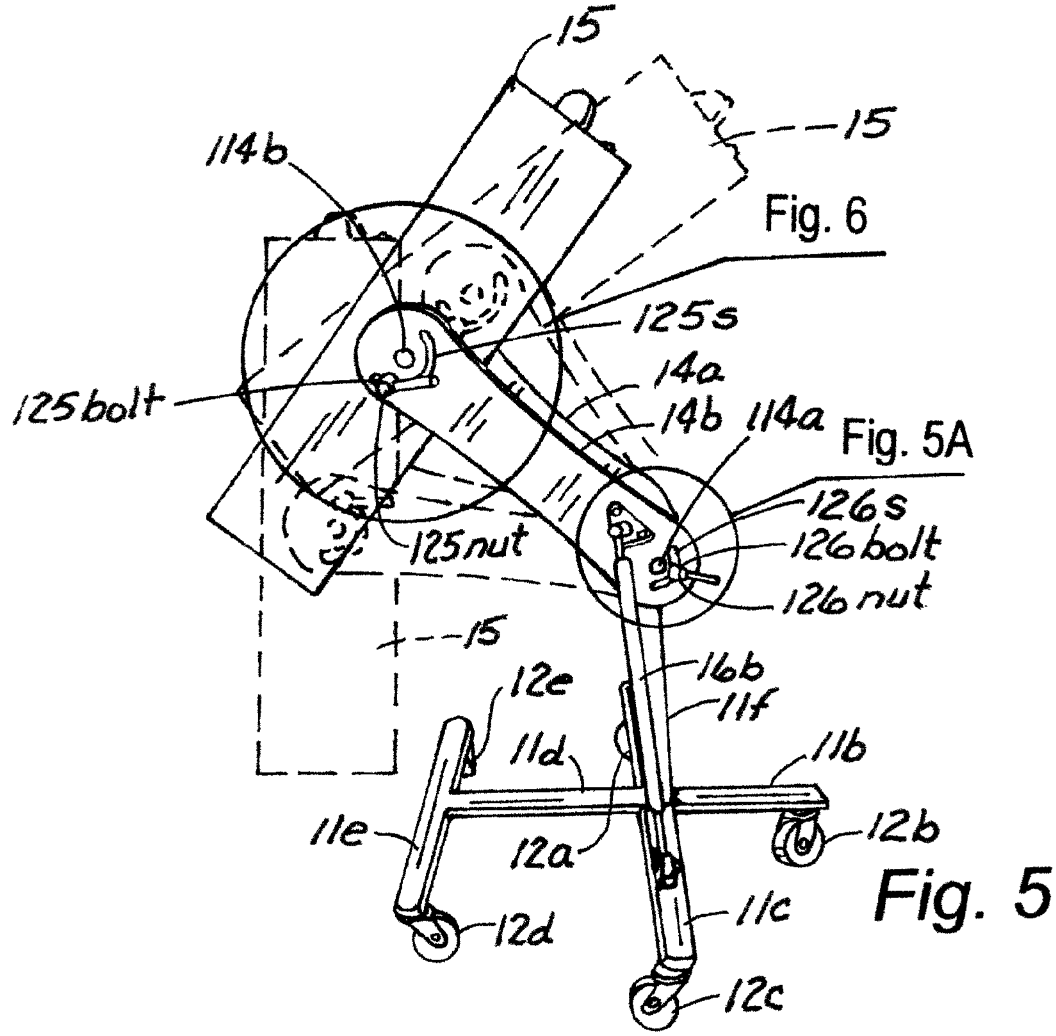
FIG. 5 is a side elevational view of the scanner shown in solid lines in one position and shown in dashed lines in two other positions.

Looking to FIGS. 1 and 3, for example, a first arcuate slot (126*s*) is disposed in the first arm (14*a*) about the first substantially horizontal axis (114*a*) and an arcuate slot (126*s*) is disposed in the second arm (14*b*) as shown in FIG. 5. As shown in FIGS. 1 and 3, a first externally threaded member (126bolt), operatively attached to the scanner (15), is disposed through the first arcuate slot (26*s*) and a first internally threaded member (126nut) is threaded onto the first externally threaded member (126bolt) for selectively frictionally holding the scanner (15) from pivoting along the first substantially horizontal axis (114*a*) when the first internally threaded member (126nut) is tightened.

Still looking at FIG. 3, a second arcuate slot (125*s*) is disposed in the first arm (14*a*) about the second substantially horizontal axis (114*b*) and a second externally threaded member (125bolt) operatively attached to the scanner (15) is disposed through the second arcuate slot (125*s*). A second internally threaded member (125nut) threaded onto the second externally threaded member (125bolt) is provided for selectively frictionally holding the scanner (15) from pivoting along the second substantially horizontal axis (114*b*) when the second internally threaded member (125nut) is tightened.

Figure 3B:
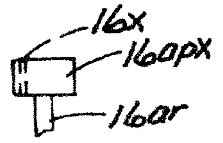
FIG. 3B shows only the piston of FIG. 3A.
Figure 4:
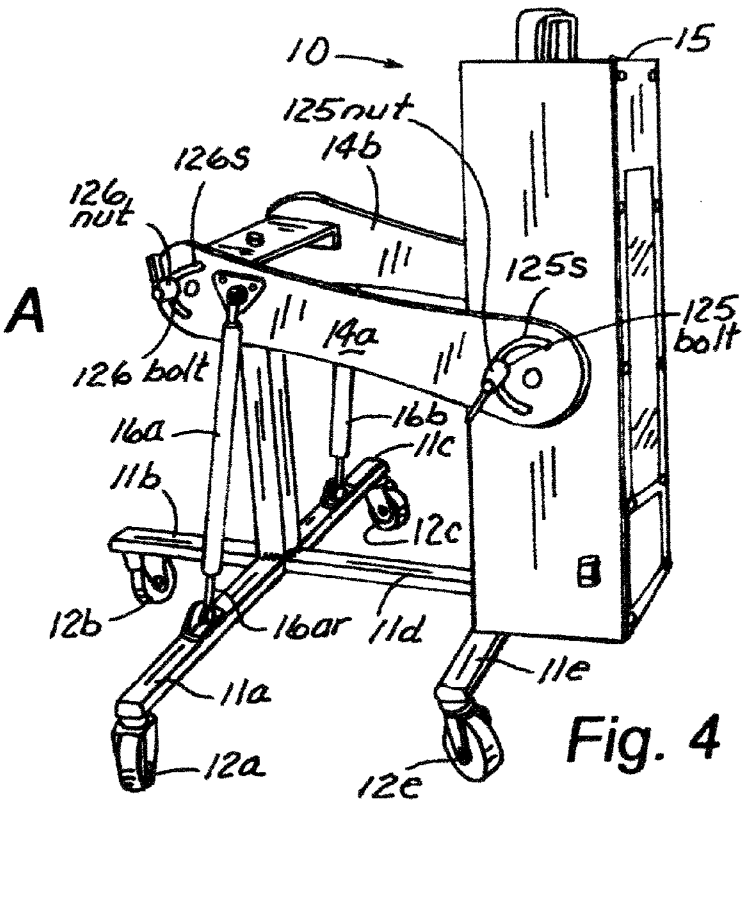
FIG. 4 is a perspective view from the same angle as shown in FIG. 3, but showing the scanner moved to the position shown in FIG. 1.

Looking at FIGS. 1, 3, 3A and 3B, the piston (16*p*) of pneumatic cylinder (16*a*) is disposed on the first part (16*r*) and disposed in a cylinder in the second part (16*ac*), and gas (16*g*) under pressure is disposed in the cylinder portion (16*ac*) thereof, thereby biasing the piston (16*p*) so that the first pneumatic cylinder (16*a*) is biased to the first length thereof, the first length being shown as the entire length of cylinder (16*a*) in FIG. 3 from where it attached to arm (14*a*) to where it attaches to frame part (Ha), the first pneumatic cylinder (16*a*) having a first part (16*ar*) operatively pivotally attached to the base frame (11) and a second part (16*ac*) operatively pivotally attached to the first arm (14), the first and second parts (16*ar*/16*ac*) being telescopically disposed with respect to each other, one of the first and second parts (16*ar*/16*ac*) having a piston portion (16*ap*) thereon slideably disposed in the other one of the first and second parts (16*ar*/16*ac*), the first pneumatic cylinder (16*a*) having a first length and a second length, the first length being greater than the second length, the first pneumatic cylinder further being biased to the first length, the first length being the entire length of cylinder (16*a*) shown in FIG. 3, and the second length of the entire cylinder (16*a*) being shown in FIG. 4.

Figure 6:
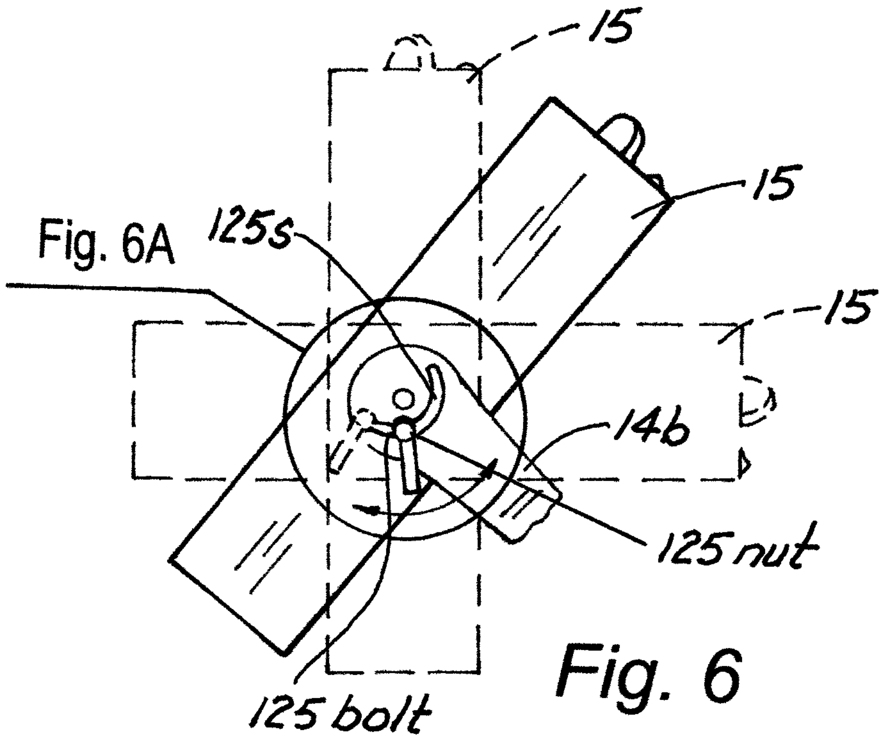
FIG. 6 is a side elevational view showing a portion, in the circle 6 of FIG. 5, showing the adjusting mechanism in a different position and showing the scanner in dashed lines in two alternate positions.
Figure 6A:
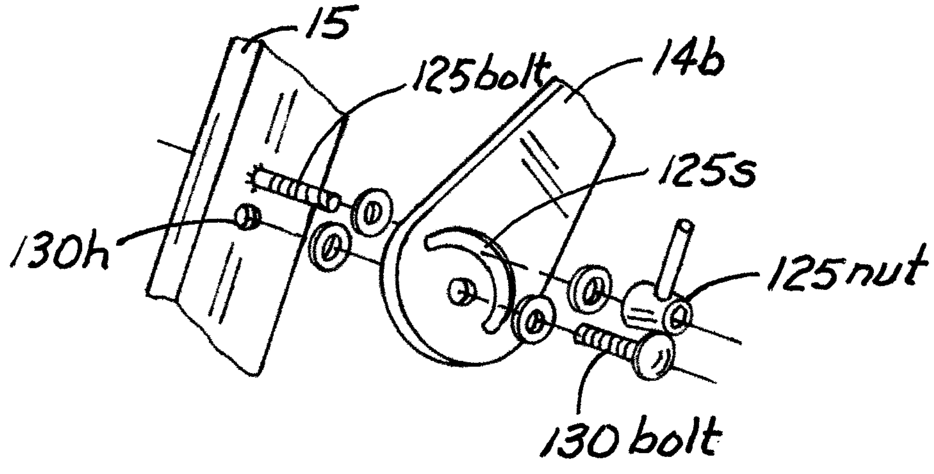
FIG. 6A is an enlarged partial exploded perspective view of the other end of the arm where it is pivotally attached to the scanner and showing the parts allowing it to be adjustable combination with similar structure on the other end of the arm as shown in FIG. 5A which attaches to the frame.

Looking now to FIGS. 2, 5 and 6, a second arm (14*b*) is also operatively pivotally attached to the base frame (11) along the first substantially horizontal axis (114*a*), the scanner (15) being also operatively attached to the second arm (14*b*) along the second substantially horizontal axis (114*b*).

A second pneumatic cylinder (16*b*) (FIG. 5), which can be identical to the first pneumatic cylinder (16*a*), is operatively pivotally attached to the base frame (11) and is also operatively pivotally attached to the second arm (14*b*). The second pneumatic cylinder (16*b*) also has a first length and a second length, the first length of the second pneumatic cylinder being greater than the second length of the second pneumatic cylinder (16*b*). The second pneumatic cylinder (16*b*) is also biased to the first length thereof.

A third arcuate slot (126*s*) is disposed in the second arm (14*b*) about the first substantially horizontal axis (114*a*) and a third externally threaded member (126bolt) operatively attached to the scanner (15), the third externally threaded member (126bolt) being disposed through the third arcuate slot (126*s*) in the second arm (14*b*). A third internally threaded member (126nut) is threaded onto the third externally threaded member (126bolt) for selectively frictionally holding the scanner (15) from pivoting along the first substantially horizontal axis (114*a*) when the third internally threaded member (126nut) is tightened.

A fourth arcuate slot (125*s*) is disposed in the second arm (14*b*) about the second substantially horizontal axis (114*b*) and a fourth externally threaded member (125bolt) is operatively attached to the scanner (15), the fourth externally threaded member (125bolt) being disposed through the fourth arcuate slot (125*s*). A fourth internally threaded member (125nut) threaded onto the fourth externally threaded member (125bolt) for selectively frictionally holding the scanner (15) from pivoting along the second substantially horizontal axis (114*b*) when the fourth internally threaded member (125nut) is tightened.

The first and second pneumatic cylinders (16*a*/16*b*) can also be called spring arms/pneumatic arms and can be like gas spring 44 shown in FIG. 8 of U.S. Pat. No. 4,287,833, or like the ones shown in U.S. Pat. Nos. 3,851,867, 3,947,006 or 4,156,523 all of such patents being incorporated herein by reference in their entirety. But simple gas springs like those used in modern day automobiles to hold up trunk lids or car hoods are preferred for the first and second pneumatic cylinders (16*a*/16*b*) rather than some of the more complicated ones shown in the aforementioned patents. FIG. 3B shows an optional piston (16*apx*) having an optional bleed orifice (16*x*).

Figure 5A:
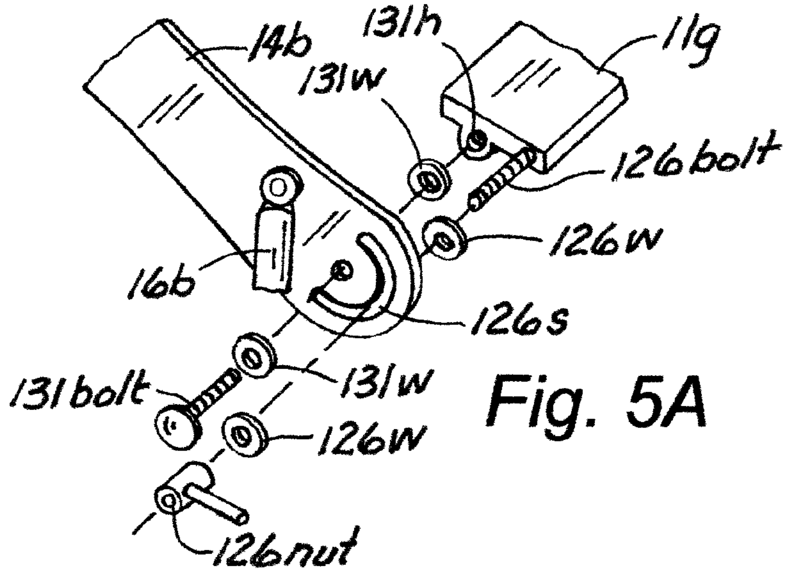
FIG. 5A is an enlarged partial exploded perspective view as shown in the circle 5A of FIG. 5 of the end of an arm where it is pivoted to a frame and showing the parts allowing it to be adjustable combination with similar structure which attaches the other end of the arm to the scanner.

In operation, when the adjusting nuts (125nut and 126nut) are loosened, the first and second pneumatic cylinders (16*a*/16*b*) will be moved to their longest, first, position thereof due to the gas (16*g*) (FIG. 3A) pushing on the cylinder (16*ap*). In such longest, first position, of the gas cylinders (16*a*/16*b*) with the adjusting nuts (125nut and 126nut) loose, the arms (14*a*/14*b*) will be tipped up to the upper dashed line position, for example as shown in FIG. 5. If it is desired to move the axis (114*b*) of the scanner down to the position shown in solid lines in FIG. 5, or the lower dashed line position of FIG. 5, the arms (14*a*/14*b*) would just be pushed down manually against the upward pressure of the gas cylinders (16*a*/16*b*) and once the axis (114*b*) is in the position desired, the nuts (126nut) would be tightened to frictionally hold the arms (14*a*/14*b*) from pivoting about the axis (114*a*) due to the pressure of nuts (126nut) against the washers (126*w*), against the arm 14*b* and against the frame (11), as shown in FIG. 5A, for example.

Once the height of axis (114*b*) has been adjusted, the scanner (15) can be pivoted to any rotary position desired about the axis (114*b*), for example to any of the solid or dashed lined positions shown in FIGS. 1-6. And once the scanner (15) is in the desired position with respect to the arms (14*a*/14*b*), for example in the solid line position shown in FIGS. 2 and 5, then the nuts (125nut) will be tightened to temporarily prevent further pivoting of scanner (15) about the axis (114*b*). Once that has been done, then the scanner can be used as shown in FIGS. 1 and 2, for example, to scan a patient's foot. The patient can go to the scanner 15, or the scanner can be rolled on the floor using caster wheels (12*e*) to the patient. Furthermore, unlike prior art devices that use structure like the base of a chair, the apparatus (10) will be low enough to be more convenient than those using prior art "caster wheeled chair bases" as the frame thereof.

The first and second pneumatic cylinders (16*a*/16*b*) and their operation are a key design feature of the present invention. The role of the first and second pneumatic cylinders (16*a*/16*b*) is to balance the weight of the scanner making it much easier to adjust. Without them the scanner (15) would fall to the floor when adjusted requiring the user to support the weight. With the first and second pneumatic cylinders (16*a*/16*b*) the scanner (15) can be adjusted without danger of falling and with a much lighter touch, unlike prior art scanning devices.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept as expressed by the attached claims.

We claim:

1. An articulated scanner comprising:

a base frame;

a first arm operatively pivotally attached to the base frame along a first horizontal axis;

a scanner operatively attached to the first arm along a second horizontal axis, the second horizontal axis being parallel to the first horizontal axis;

a first pneumatic cylinder having a first part operatively pivotally attached to the base frame and a second part operatively pivotally attached to the first arm, the first and second parts being telescopically disposed with respect to each other, one of the first and second parts having a piston portion thereon slideably disposed in the other one of the first and second parts, the first pneumatic cylinder having a first length and a second length, the first length being greater than the second length, the first pneumatic cylinder further being biased to the first length;

a first arcuate slot disposed in the first arm about the first horizontal axis;

a first externally threaded member operatively attached to the scanner being disposed through the first arcuate slot;

a first internally threaded member threaded onto the first externally threaded member for selectively frictionally holding the scanner from pivoting along the first horizontal axis when the first internally threaded member is tightened;

a second arcuate slot disposed in the first arm about the second horizontal axis;

a second externally threaded member operatively attached to the scanner being disposed through the second arcuate slot; and a second internally threaded member threaded onto the second externally threaded member for selectively frictionally holding the scanner from pivoting along the second horizontal axis when the second internally threaded member is tightened.

2. The articulated scanner of claim 1 wherein the piston is disposed on the first part and disposed in a cylinder in the second part, and gas under pressure being disposed in the cylinder portion thereof thereby biasing the piston so that the first pneumatic cylinder is biased to the first length thereof.

3. The articulated scanner of claim 1 further including a second arm operatively pivotally attached to the base frame along the first horizontal axis;

the scanner being also operatively attached to the second arm along the second horizontal axis;

a second pneumatic cylinder operatively pivotally attached to the base frame and operatively pivotally attached to the second arm, the second pneumatic cylinder also having a first length and a second length, the first length of the second pneumatic cylinder being greater than the second length of the second pneumatic cylinder, the second pneumatic cylinder further being biased to the first length thereof;

a third arcuate slot disposed in the second arm about the first horizontal axis;

a third externally threaded member operatively attached to the scanner, the third externally threaded member being disposed through the third arcuate slot in the second arm;

a third internally threaded member threaded onto the third externally threaded member for selectively frictionally holding the scanner from pivoting along the first horizontal axis when the third internally threaded member is tightened;

a fourth arcuate slot disposed in the second arm about the second horizontal axis;

a fourth externally threaded member operatively attached to the scanner, the fourth externally threaded member being disposed through the fourth arcuate slot; and a fourth internally threaded member threaded onto the fourth externally threaded member for selectively frictionally holding the scanner from pivoting along the second horizontal axis when the fourth internally threaded member is tightened.

4. The articulated scanner of claim 1 wherein said piston portion having an aperture therein to allow only a limited amount of gaseous flow therethrough which the first and second parts telescope with respect to each other to thereby resist but yet allow telescopic movement between the first and second parts of the pneumatic cylinder.

* * * * *